United States Patent
Gong

(10) Patent No.: US 10,103,807 B2
(45) Date of Patent: Oct. 16, 2018

(54) OPTICAL SIGNAL TO NOISE RATIO DETECTION CIRCUIT, APPARATUS AND METHOD

(71) Applicant: ZTE CORPORATION, Guangdong (CN)

(72) Inventor: Yadong Gong, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/528,484

(22) PCT Filed: Aug. 11, 2015

(86) PCT No.: PCT/CN2015/086677
§ 371 (c)(1),
(2) Date: May 19, 2017

(87) PCT Pub. No.: WO2016/078446
PCT Pub. Date: May 26, 2016

(65) Prior Publication Data
US 2017/0264363 A1 Sep. 14, 2017

(30) Foreign Application Priority Data
Nov. 21, 2014 (CN) .......................... 2014 1 0674816

(51) Int. Cl.
*H04J 14/00* (2006.01)
*H04B 10/079* (2013.01)
(Continued)

(52) U.S. Cl.
CPC ....... *H04B 10/07953* (2013.01); *H04B 10/07* (2013.01); *H04Q 11/0005* (2013.01);
(Continued)

(58) Field of Classification Search
CPC ...................... H04B 10/07953; H04B 10/548; H04B 10/07; H04Q 11/0005; H04Q 11/0062;
(Continued)

(56) References Cited

U.S. PATENT DOCUMENTS

| 7,336,728 B2 * | 2/2008 | Dorrer ............. H04B 10/07953 375/226 |
| 7,729,617 B2 | 6/2010 | Sheth |

(Continued)

FOREIGN PATENT DOCUMENTS

| CN | 1567804 A | 1/2005 |
| CN | 1859043 A | 11/2006 |

(Continued)

OTHER PUBLICATIONS

International Search Report dated Nov. 3, 2015 for International Application No. PCT/CN2015/086677, 10 pages.

*Primary Examiner* — Amritbir Sandhu
(74) *Attorney, Agent, or Firm* — Knobbe, Martens, Olson & Bear, LLP

(57) ABSTRACT

Disclosed are embodiments of an apparatus and method relating to an optical signal to noise ratio detection circuit, adopting an optical switch, a tunable optical filter, a photo-electric conversion module, a pilot-tone modulation signal conditioning module and a control module. After the photoelectric conversion module converts a to-be-detected optical signal to a voltage signal, the pilot-tone modulation signal conditioning module respectively amplifies an AC signal and a DC signal in the voltage signal, correspondingly converts the AC signal and the DC signal to two-way digital signals, determines a modulation depth of the pilot-tone modulation signal and a modulation depth of an ASE noise according to the two-way digital signals, and calculates an optical signal to noise ratio of the optical signal.

10 Claims, 4 Drawing Sheets

(51) Int. Cl.
*H04B 10/07* (2013.01)
*H04Q 11/00* (2006.01)
*H04B 10/548* (2013.01)

(52) U.S. Cl.
CPC ....... *H04Q 11/0062* (2013.01); *H04B 10/548* (2013.01); *H04Q 2011/0018* (2013.01); *H04Q 2011/0039* (2013.01); *H04Q 2011/0083* (2013.01)

(58) Field of Classification Search
CPC ... H04Q 2011/0018; H04Q 2011/0039; H04Q 2011/0083
USPC ...................................... 398/25–33
See application file for complete search history.

(56) References Cited

U.S. PATENT DOCUMENTS

| | | | |
|---|---|---|---|
| 8,155,519 B2 | 4/2012 | Sheth | |
| 8,249,464 B2 | 8/2012 | Shoichiro et al. | |
| 8,280,248 B2* | 10/2012 | Li | H04B 10/0775 398/195 |
| 8,750,713 B2 | 6/2014 | Sheth | |
| 8,798,462 B2 | 8/2014 | Mori | |
| 9,264,144 B2* | 2/2016 | Yu | H04L 27/18 |
| 9,397,478 B2* | 7/2016 | Takenaka | H01S 5/183 |
| 9,397,748 B2 | 7/2016 | Shang et al. | |
| 9,621,263 B2 | 4/2017 | Wei et al. | |
| 9,831,945 B2* | 11/2017 | Shang | H04B 10/0773 |
| 2004/0033079 A1 | 2/2004 | Sheth | |
| 2010/0241913 A1 | 9/2010 | Sheth | |
| 2012/0106951 A1* | 5/2012 | Wan | H04B 10/0775 398/26 |
| 2012/0155882 A1 | 6/2012 | Sheth | |
| 2012/0301139 A1 | 11/2012 | Mori | |
| 2015/0010299 A1* | 1/2015 | Wei | H04B 10/07953 398/26 |
| 2015/0222354 A1* | 8/2015 | Shang | H04B 10/0775 398/26 |
| 2016/0227300 A1* | 8/2016 | Lai | H04Q 11/0005 |
| 2016/0315724 A1* | 10/2016 | Dou | H04L 27/2657 |
| 2017/0104529 A1* | 4/2017 | Dou | H04B 10/07951 |

FOREIGN PATENT DOCUMENTS

| | | |
|---|---|---|
| CN | 102742185 A | 10/2012 |
| CN | 102904635 A | 1/2013 |
| JP | 2010245772 A | 10/2010 |
| WO | 03103187 A1 | 12/2003 |

* cited by examiner

OPTICAL SIGNAL TO NOISE RATIO DETECTION CIRCUIT, APPARATUS AND METHOD

CROSS REFERENCE TO RELATED APPLICATIONS

This application is the U.S. National Phase Application under 35 U.S.C. § 371 of International Application No. PCT/CN2015/086677, filed Aug. 11, 2015, designating the U.S. and published as WO 2016/078446 A1 on May 26, 2016, which claims the benefit of Chinese Patent Application No. 201410674816.2, filed Nov. 21, 2014, both of which are hereby incorporated by reference in their entirety.

FIELD

The present invention relates to the technical field of optical communications, and in particular relates to an optical signal to noise ratio detection circuit, apparatus and method.

BACKGROUND

Dense wavelength division multiplexing (DWDM) is used for transmission with one optical fiber in combination with a group of optical wavelengths. This is a laser technology for improving a bandwidth on an existing optical fiber backbone network. An optical signal to noise ratio (OSNR) in a wavelength division multiplexing system is a key performance parameter for evaluating the wavelength division multiplexing system. The OSNR is defined as a ratio of optical signal power to noise power when an optical effective bandwidth is within 0.1 nm.

As a transmission rate of the wavelength division multiplexing system is continuously increased, the OSNR is more difficult to measure. For the optical transmission systems with the transmission rates of 2.5 Gb/s and 10 Gb/s, since a spectral width is much less than a channel spacing of an optical system, an interpolation method is generally employed to measure the OSNR, i.e. the noise power outside the spectrum is first measured, then the noise power of an adjacent wavelength is obtained by utilizing the interpolation method, and finally the optical signal to noise ratio is calculated. However, for current high-speed optical transmission systems with the transmission rates of 40 Gb/s and 100 Gb/s, since a spectral width is approximate to and even greater than a channel spacing of the optical system, the noise power among channels cannot be accurately measured in the interpolation method, and the noise power of the adjacent wavelength cannot be measured. Therefore, the detection of the optical signal to noise ratio of the high-speed optical transmission system cannot be realized by the traditional interpolation method.

SUMMARY

A main objective of embodiments of the present invention is to provide an optical signal to noise ratio detection circuit, apparatus and method, which is intended to solve a problem that a traditional interpolation method cannot realize detection of an optical signal to noise ratio in a high-speed optical transmission system.

In order to achieve the above objective, embodiments of the present invention provide an optical signal to noise ratio detection circuit. The optical signal to noise ratio detection circuit includes: an optical switch, configured to access multiple to-be-detected optical signals containing a pilot-tone modulation signal and amplified spontaneous emission (ASE) noise and gate a to-be-detected optical signal to be detected from the multiple to-be-detected optical signals; a tunable optical filter, configured to adjust a modulation frequency of the to-be-detected optical signal gated by the optical switch as a center frequency of the to-be-detected optical signal; a photoelectric conversion module, configured to convert the to-be-detected optical signal with the adjusted modulation frequency into a voltage signal; a pilot-tone modulation signal conditioning module, configured to separately amplify an AC signal and a DC signal in the voltage signal, correspondingly convert the AC signal and the DC signal into two-way digital signals, determine a modulation depth of the pilot-tone modulation signal and a modulation depth of the ASE noise according to the two-way digital signals, and calculate an optical signal to noise ratio of the to-be-detected optical signal; and a control module, configured to control operation of an optical switch module, the tunable optical filter, the photoelectric conversion module and the pilot-tone modulation signal conditioning module, and report a calculation result of the optical signal to noise ratio to an optical transmission management system.

Optionally, the photoelectric conversion module may include an optical detector and a sampling resistor; a negative end of the optical detector is connected with a linear power supply; a positive end of the optical detector is earthed through the sampling resistor; and a common end of the optical detector and the sampling resistor is connected with an input end of the pilot-tone modulation signal conditioning module, so as to output the voltage signal to the pilot-tone modulation signal conditioning module.

Optionally, the pilot-tone modulation signal conditioning module may include a voltage following unit, configured to extract the voltage signal output by the photoelectric conversion module; an AC signal conditioning unit, configured to amplify the AC signal in the voltage signal and convert the amplified AC signal to a first digital signal; a DC signal conditioning unit, configured to amplify the DC signal in the voltage signal and convert the amplified DC signal to a second digital signal; and an optical signal to noise ratio calculation unit, configured to calculate an optical power AC amplitude of the pilot-tone modulation signal, an optical power DC amplitude of the optical signal when the pilot-tone modulation signal is loaded and noise power in a bandwidth of the tunable optical filter by utilizing an FFT algorithm according to the first digital signal and the second digital signal so as to determine the modulation depth of the pilot-tone modulation signal and the modulation depth of the ASE noise, and calculate the optical signal to noise ratio of the to-be-detected optical signal according to the modulation depth of the pilot-tone modulation signal and the modulation depth of the ASE noise.

Optionally, the voltage following unit may includes a first voltage follower; an in-phase input end of the first voltage follower is connected with an output end of the photoelectric conversion module, an anti-phase input end of the first voltage follower is connected with an output end of the first voltage follower, and an output end of the first voltage follower is respectively connected with input ends of the AC signal conditioning unit and the DC signal conditioning unit.

Optionally, the AC signal conditioning unit may includes: a first amplification subunit, configured to amplify the AC signal in the voltage signal extracted by the voltage following unit; a first voltage following subunit, configured to extract the AC signal amplified by the first amplification subunit; and a first ADC sampling subunit, configured to convert the AC signal extracted by the first voltage following subunit into the first digital signal, and output the first digital signal to the optical signal to noise ratio calculation unit.

Optionally, the first amplification subunit may includes a first amplifier, a second amplifier, a first capacitor, a second capacitor, a third capacitor, a first resistor, a second resistor, a third resistor and a fourth resistor; an in-phase input end of the first amplifier is connected with an output end of the voltage following unit through the first capacitor; an output end of the first amplifier is connected with an in-phase input end of the second amplifier and is earthed successively through the first resistor, the second resistor and the second capacitor; an anti-phase input end of the first amplifier is connected with a common end of the first resistor and the second resistor; an output end of the second amplifier is connected with the input end of the first voltage following subunit and is earthed successively through the third resistor, the fourth resistor and the third capacitor, and an anti-phase input end of the second amplifier is connected with a common end of the third resistor and the fourth resistor; the first voltage following subunit includes a second voltage follower; an in-phase input end of the second voltage follower is connected with the output end of the first amplification subunit; an anti-phase input end of the second voltage follower is connected with the output end of the second voltage follower, and the output end of the second voltage follower is connected with an input end of the first ADC sampling subunit; the first ADC sampling subunit includes a third amplifier, a fifth resistor, a sixth resistor, a seventh resistor, an eighth resistor and a first analog-digital converter; an in-phase input end of the third amplifier is connected with the output end of the first voltage following subunit through the fifth resistor; an anti-phase input end of the third amplifier is connected to a first reference power supply through the sixth resistor; a first differential output end of the third amplifier is connected with a first sampling end of the first analog-digital converter, and a second differential output end of the third amplifier is connected with a second sampling end of the first analog-digital converter; the seventh resistor is connected between the first differential output end of the third amplifier and the in-phase input end of the third amplifier, and the eighth resistor is connected between the second differential output end of the third amplifier and the anti-phase input end of the third amplifier; and the output end of the first analog-digital converter is connected with the first input end of the optical signal to noise ratio calculation unit.

Optionally, the DC signal conditioning unit may includes: a second amplification subunit, configured to amplify the DC signal in the voltage signal extracted by the voltage following unit; a second voltage following subunit, configured to extract the DC signal amplified by the second amplification subunit; and a second ADC sampling subunit, configured to convert the DC signal extracted by the second voltage following subunit into the second digital signal and output the second digital signal to the optical signal to noise ratio calculation unit.

Optionally, the second amplification subunit may includes a fourth amplifier, a fifth amplifier, a ninth resistor, a tenth resistor, an eleventh resistor and a twelfth resistor; an in-phase input end of the fourth amplifier is connected with the output end of the voltage following unit; an output end of the fourth amplifier is connected with an in-phase input end of the fifth amplifier and is earthed successively through the ninth resistor and the tenth resistor; an anti-phase input end of the fourth amplifier is connected with a common end of the ninth resistor and the tenth resistor; the output end of the fifth amplifier is connected with the input end of the second voltage following subunit and is earthed successively through the eleventh resistor and the twelfth resistor, and an anti-phase input end of the fifth amplifier is connected with a common end of the eleventh resistor and the twelfth resistor; the second voltage following subunit includes a third voltage follower; the in-phase input end of the third voltage follower is connected with the output end of the second amplification subunit, the anti-phase input end of the third voltage follower is connected with the output end of the third voltage follower, and the output end of the third voltage follower is connected with the input end of the second ADC sampling subunit; the second ADC sampling subunit includes a sixth amplifier, a thirteenth resistor, a fourteenth resistor, a fifteenth resistor, a sixteenth resistor and a second analog-digital converter; an in-phase input end of the sixth amplifier is connected with the output end of the second voltage following subunit through the thirteenth resistor, an anti-phase input end of the sixth amplifier is connected to a second reference power supply through the fourteenth resistor, a first differential output end of the sixth amplifier is connected with a first sampling end of the second analog-digital converter, and a second differential output end of the sixth amplifier is connected with a second sampling end of the second analog-digital converter; the fifteenth resistor is connected between the first differential output end of the sixth amplifier and the in-phase input end of the sixth amplifier, and the sixteenth resistor is connected between the second differential output end of the sixth amplifier and the anti-phase input end of the sixth amplifier; and the output end of the second analog-digital converter is connected with a second input end of the optical signal to noise ratio calculation unit.

In order to achieve the above objective, embodiments of the present invention further provide an optical signal to noise ratio detection apparatus. The optical signal to noise ratio detection apparatus includes an optical forwarding unit, a plurality of optical amplification units and an optical signal to noise ratio detection circuit; the optical forwarding unit modulates a pilot-tone modulation signal onto a main optical signal in an optical module thereof and outputs the optical signal with the pilot-tone modulation signal; each optical amplification unit receives the optical signal output by the optical forwarding unit and selects a part of the received optical signals to send to the optical signal to noise ratio detection circuit to perform the optical signal to noise ratio detection, so as to provide multi-way to-be-detected optical signals containing the pilot-tone modulation signal and ASE noise; the optical signal to noise ratio detection circuit includes: an optical switch, configured to access multi-way to-be-detected optical signals containing the pilot-tone modulation signal and amplified spontaneous emission (ASE) noise and gate the to-be-detected optical signal from the multi-way to-be-detected optical signals; a tunable optical filter, configured to adjust a modulation frequency of the to-be-detected optical signal gated by the optical switch as a center frequency of the to-be-detected optical signal; a photoelectric conversion module, configured to convert the to-be-detected optical signal with the adjusted modulation frequency into a voltage signal; a pilot-tone modulation signal conditioning module, configured to respectively amplify an AC signal and a DC signal in the voltage signal, correspondingly convert the AC signal and the DC signal to two-way digital signals, determine a modulation depth of the pilot-tone modulation signal and a modulation depth of the ASE noise according to the two-way digital signals, and calculate an optical signal to noise ratio of the to-be-detected optical signal; and a control module, configured to control operation of an optical switch module, the tunable optical filter, the photoelectric conversion module and the pilot-tone modulation signal conditioning module and report a calculation result of the optical signal to noise ratio to an optical transmission management system.

Furthermore, in order to achieve the above objective, embodiments of the present invention further provide an optical signal to noise ratio detection method applied to the optical signal to noise ratio detection apparatus. The optical signal to noise ratio detection method includes following steps: modulating a pilot-tone modulation signal on a main optical signal, and outputting an optical signal with the pilot-tone modulation signal; selecting a part of the optical signals with the pilot-tone modulation signal to perform the optical signal to noise ratio detection so as to provide multiple to-be-detected optical signals containing the pilot-tone modulation signal and ASE noise; gating the to-be-detected optical signal to be detected from the multi-way to-be-detected optical signals containing the pilot-tone modulation signal and the ASE noise, and adjusting a modulation frequency of the gated to-be-detected optical signal as a center frequency of the to-be-detected optical signal; converting the to-be-detected optical signal with the adjusted modulation frequency into a voltage signal; respectively amplifying an AC signal and a DC signal in the voltage signal, correspondingly converting the AC signal and the DC signal into two-way digital signals, calculating an optical signal to noise ratio of the to-be-detected optical signal according to the two-way digital signals, and reporting a calculation result of the optical signal to noise ratio to an optical transmission management system.

In the optical signal to noise ratio detection circuit, apparatus and method provided by embodiments of the present invention, the multi-way to-be-detected optical signals containing the pilot-tone modulation signal and the ASE noise are accessed through the optical switch; the to-be-detected optical signal to be detected is gated from the multi-way to-be-detected optical signals to perform the optical signal to noise ratio detection; the tunable optical filter adjusts the modulation frequency of the to-be-detected optical signal gated by the optical switch as the center frequency of the to-be-detected optical signal; the photoelectric conversion module converts the to-be-detected optical signal with the adjusted modulation frequency into the voltage signal; the pilot-tone modulation signal conditioning module respectively amplifies the AC signal and the DC signal in the voltage signal, correspondingly converts the AC signal and the DC signal into two-way digital signals, determines the modulation depth of the pilot-tone modulation signal and the modulation depth of the ASE noise according to the two-way digital signals, and calculates the optical signal to noise ratio of the optical signal; and the control module reports the calculation result of the optical signal to noise ratio to the optical transmission management system, so that the optical signal to noise ratio of each way of accessed optical signals can be accurately detected, thereby being applicable to high-speed optical transmission systems of 40 Gb/s and 100 Gb/s, and solving a problem that a traditional interpolation method cannot realize the detection of the optical signal to noise ratio in the high-speed optical transmission systems.

BRIEF DESCRIPTION OF THE DRAWINGS

Drawings described herein are intended to provide a further understanding of the present invention and constitute a part of the present application. Exemplary embodiments of the present invention and descriptions thereof are intended to explain the present invention and are not to be construed as an improper limitation to the present invention. In the drawings.

The objective, functional characteristics and advantages of the present invention are further described in combination with embodiments and with reference to the drawings.

DETAILED DESCRIPTION

It should be understood that specific embodiments described herein are only used for explaining the present invention rather than limiting the present invention.

Embodiments of the present invention provide an optical signal to noise ratio detection circuit which is applied to a high-speed optical transmission system.

Figure 1:
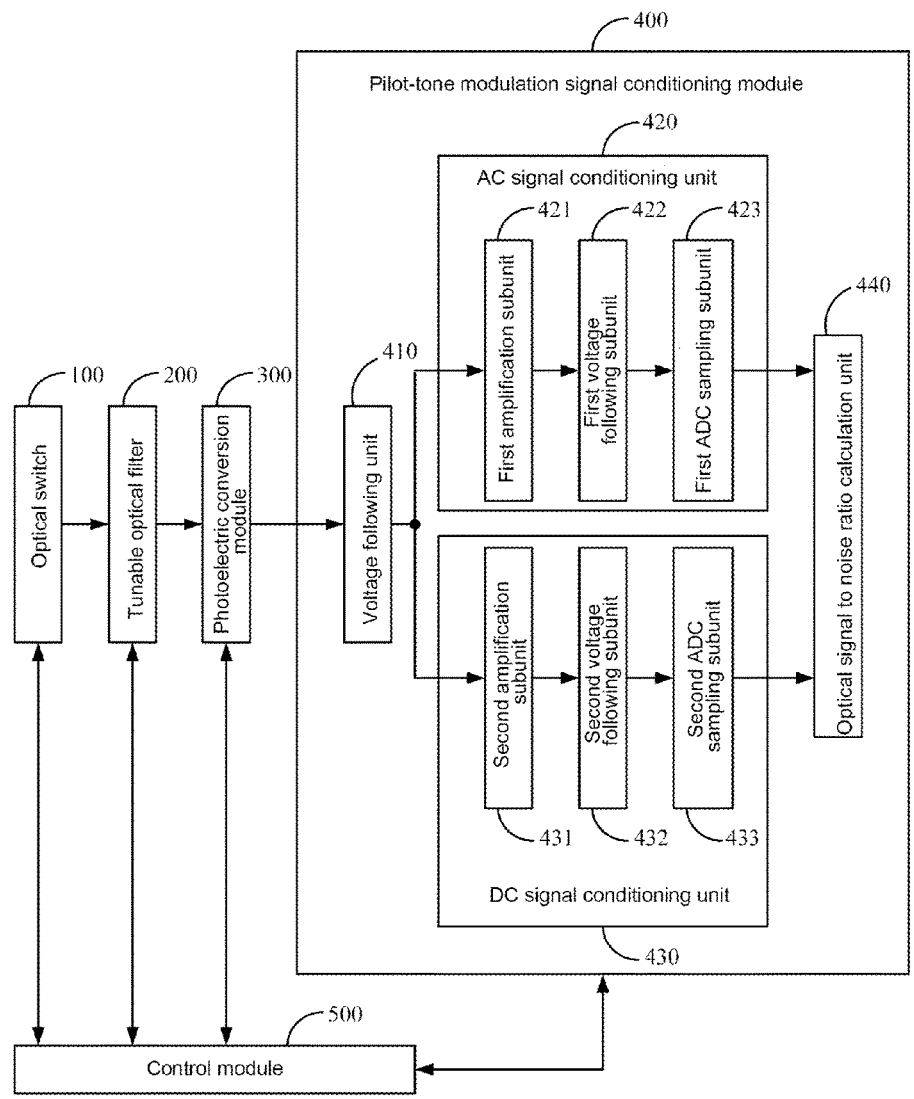
FIG. 1 is a principle structural diagram illustrating an embodiment of an optical signal to noise ratio detection circuit according to the present invention.
Figure 2:
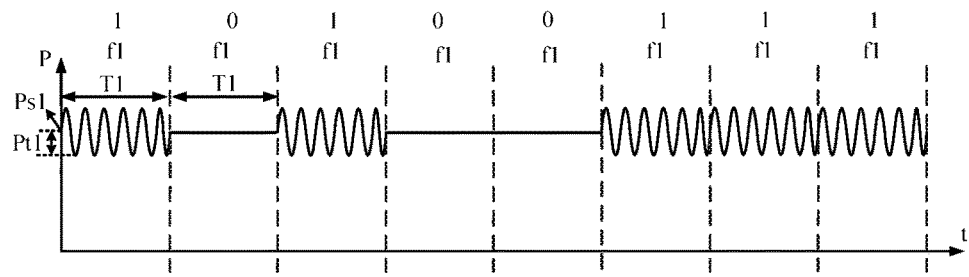
FIG. 2 is a schematic waveform diagram illustrating an optical signal with a pilot-tone modulation signal in an optical signal to noise ratio detection circuit according to embodiments of the present invention.
Figure 3:
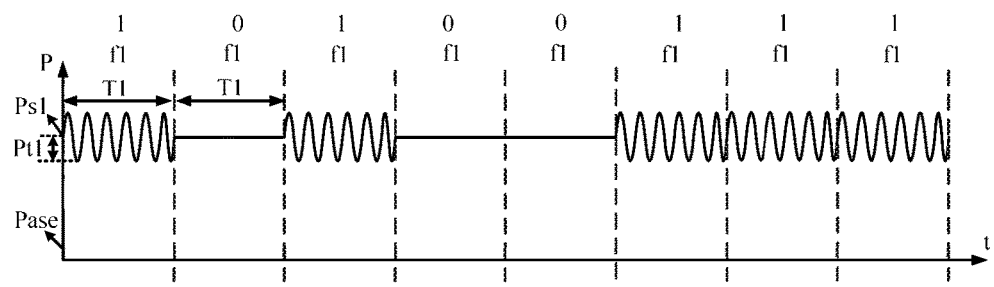
FIG. 3 is a schematic waveform diagram illustrating an optical signal with a pilot-tone modulation signal and ASE noise in the optical signal to noise ratio detection circuit according to embodiments of the present invention.

Referring to FIG. 1 to FIG. 3, a principle block diagram illustrating an embodiment of an optical signal to noise ratio detection circuit of the present invention is provided; FIG. 2 is a schematic waveform diagram illustrating an optical signal with a pilot-tone modulation signal in the optical signal to noise ratio detection circuit according to embodiments of the present invention; and FIG. 3 is a schematic waveform diagram illustrating an optical signal with a pilot-tone modulation signal and ASE noise in the optical signal to noise ratio detection circuit according to embodiments of the present invention.

In an embodiment of the present invention, the optical signal to noise ratio detection circuit includes an optical switch 100, a tunable optical filter 200, a photoelectric conversion module 300, a pilot-tone modulation signal conditioning module 400 and a control module 500; the optical switch 100, the tunable optical filter 200, the photoelectric conversion module 300 and the pilot-tone modulation signal conditioning module 400 are successively connected with one another; and the optical switch 100, the tunable optical filter 200, the photoelectric conversion module 300 and the pilot-tone modulation signal conditioning module are respectively connected with the control module 500.

The optical switch 100 is configured to access multi-way to-be-detected optical signals containing a pilot-tone modulation signal and amplified spontaneous emission (ASE) noise and gate a to-be-detected optical signal to be detected from the multiple to-be-detected optical signals; the tunable optical filter 200 is configured to adjust a modulation frequency of the to-be-detected optical signal gated by the optical switch 100 as a center frequency of the to-be-detected optical signal; the photoelectric conversion module 300 is configured to convert the to-be-detected optical signal with the adjusted modulation frequency into a voltage signal; the pilot-tone modulation signal conditioning module 400 is configured to respectively amplify an AC signal and a DC signal in the voltage signal, correspondingly convert the AC signal and the DC signal into two-way digital signals, determine a modulation depth of the pilot-tone modulation signal and a modulation depth of the ASE noise according to the two-way digital signals, and calculate an optical signal to noise ratio of the to-be-detected optical signal; and the control module 500 is configured to control operation of an optical switch 100 module, the tunable optical filter 200, the photoelectric conversion module 300 and the pilot-tone modulation signal conditioning module 400, and report a calculation result of the optical signal to noise ratio to an optical transmission management system, and the control module 500 may be a CPU of the high-speed optical transmission system.

In the high-speed optical transmission system, one or more stations may be arranged to detect the optical signal to noise ratio of the optical signal, and each station may circularly detect one-way or multi-way optical signals. In the present embodiment, multi-way to-be-detected optical signals containing the pilot-tone modulation signal and ASE noise are accessed through the optical switch 100, and a one-way to-be-detected optical signal to be detected is gated from the accessed multi-way to-be-detected optical signals to perform the optical signal to noise ratio detection; the optical switch 100 may access 4 to 8 ways of to-be-detected optical signals; and the optical switch 100 gates the one-way to-be-detected optical signal to perform the detection each time. For example, when the optical switch 100 accesses five-way to-be-detected optical signals, the optical switch 100 gates the one-way to-be-detected optical signal to perform the detection each time, and the five ways of to-be-detected optical signals are successively and circularly gated. The tunable optical filter 200 adjusts a modulation frequency of the to-be-detected optical signal gated by the optical switch 100 as the center frequency of the to-be-detected optical signal; the to-be-detected optical signal gated by the optical switch 100 may include multiple partial waves of different frequencies (i.e. different wavelengths); each partial wave has own center frequency; the tunable optical filter 200 circularly scans each partial wave to find out the center frequency of each partial wave each time; and then the frequency of the partial wave is adjusted as the center frequency, so that the frequency of the partial wave is stable. For example, a to-be-detected optical signal includes 80 partial waves, and the tunable optical filter 200 circularly scans the 80 partial waves and finds out the center frequencies thereof; and furthermore, not all of the 80 partial waves are necessarily detected, and the tunable optical filter 200 may select the partial waves to be detected as required, and filters out the rest partial waves.

The photoelectric conversion module 300 converts the to-be-detected optical signal with adjusted modulation frequency into a voltage signal; and the voltage signal includes an AC signal with a pilot-tone modulation signal and a DC signal with ASE noise and the pilot-tone modulation signal. The pilot-tone modulation signal conditioning module 400 respectively amplifies the AC signal and the DC signal in the voltage signal, correspondingly converts the AC signal and the DC signal into two-way digital signals, determines a modulation depth of the pilot-tone modulation signal and the modulation depth of the ASE noise, and calculates an optical signal to noise ratio of the to-be-detected optical signal; and the control module 500 reports the calculation result of the optical signal to noise ratio to the optical transmission management system, and in this way, the optical signal to noise ratio of each way of to-be-detected signals is circularly calculated, thereby detecting the optical signal to noise ratio of the optical signal in the high-speed optical transmission system.

Relative to an existing art, the optical signal to noise ratio detection circuit in embodiments of the present invention can accurately detect the optical signal to noise ratio of each way of accessed optical signals, is applicable to the high-speed optical transmission systems of 40 Gb/s and 100 Gb/s, and solves the problem that the traditional interpolation method cannot realize the detection of the optical signal to noise ratio in the high-speed optical transmission system.

As shown in FIG. 1, the pilot-tone modulation signal conditioning module 400 includes a voltage following unit 410, an AC signal conditioning unit 420, a DC signal conditioning unit 430 and an optical signal to noise ratio calculation unit 440; an input end of the voltage following unit 410 is connected with an output end of the photoelectric conversion module 300; an output end of the voltage following unit 410 is respectively connected with an input end of the AC signal conditioning unit 420 and an input end of the DC signal conditioning unit 430; an output end of the AC signal conditioning unit 420 is connected with a first input end of the optical signal to noise ratio calculation unit 440; and an output end of the DC signal conditioning unit 430 is connected with a second input end of the optical signal to noise ratio calculation unit 440.

The voltage following unit 410 is configured to extract the voltage signal output by the photoelectric conversion module 300; the AC signal conditioning unit 420 is configured to amplify the AC signal in the voltage signal and convert the amplified AC signal to a first digital signal; the DC signal conditioning unit 430 is configured to amplify the DC signal in the voltage signal and convert the amplified DC signal to a second digital signal; and the optical signal to noise ratio calculation unit 440 is configured to calculate an optical power AC amplitude of the pilot-tone modulation signal, an optical power DC amplitude of the optical signal when the pilot-tone modulation signal is loaded and noise power in a bandwidth of the tunable optical filter 200 by utilizing an FFT algorithm according to the first digital signal and the second digital signal so as to determine the modulation depth of the pilot-tone modulation signal and the modulation depth of the ASE noise, and calculate the optical signal to noise ratio of the to-be-detected optical signal according to the modulation depth of the pilot-tone modulation signal and the modulation depth of the ASE noise.

The optical signal to noise ratio calculation unit 440 may be an FPGA (field-programmable gate array) and/or a DSP (digital signal processor).

In the pilot-tone modulation signal conditioning unit 400, the voltage signal output by the photoelectric conversion unit 300 is extracted by the voltage following unit 410, so that the voltage signal is stably output to the AC signal conditioning unit 420 and the DC signal conditioning unit 430, and the distortion of the voltage signal is avoided. The AC signal conditioning unit 420 acquires the AC signal in the voltage signal output by the voltage following unit 410, amplifies the AC signal, performs the analogue-to-digital conversion for the amplified AC signal, converts the AC signal to the first digital signal, and outputs the first digital signal to the optical signal to noise ratio calculation unit 440;

and the DC signal conditioning unit 430 acquires the DC signal in the voltage signal output by the voltage following unit 410, amplifies the DC signal, performs the analogue-to-digital conversion on the amplified DC signal, converts the DC signal into the second digital signal, and outputs the second digital signal to the optical signal to noise calculation unit 440.

The optical signal to noise ratio calculation unit 440 calculates the optical power AC amplitude of the pilot-tone modulation signal, the optical power DC amplitude of the optical signal when the pilot-tone modulation signal is loaded and the noise power in the bandwidth of the tunable optical filter 200 by utilizing the FFT algorithm according to the received first digital signal and the second digital signal. Specifically, the signal amplitude of the AC signal, the signal amplitude of the DC signal and the signal amplitude of the ASE noise in a certain period of time may be calculated, thereby calculating the optical power AC amplitude of the pilot-tone modulation signal, the optical power DC amplitude of the optical signal when the pilot-tone modulation signal is loaded and the noise power in the bandwidth of the tunable optical filter 200; and a calculation principle of the specific FFT algorithm is the well-known knowledge in the art and is not repeated herein. The optical signal with the pilot-tone modulation signal (i.e. the optical signal output by an optical module of the optical forwarding unit) is shown in FIG. 2; and the optical signal with the pilot-tone modulation signal and the ASE noise is shown in FIG. 3. In FIG. 2 and FIG. 3, a transverse axis t indicates time; a longitudinal axis P indicates power; logic "1" indicates that the pilot-tone modulation signal exists; logic "0" indicates that no pilot-tone modulation signal exists; T1 indicates a period of the pilot-tone modulation signal; f1 indicates the modulation frequency of the pilot-tone modulation signal; Pt1 indicates the optical power AC amplitude of the pilot-tone modulation signal; Ps1 indicates the optical power DC amplitude of the optical signal with a source end loaded with the pilot-tone modulation signal; and Pase indicates the noise power in the bandwidth of the tunable optical filter 200.

The optical signal to noise ratio calculation unit 440 determines the modulation depth of the pilot-tone modulation signal and the modulation depth of the ASE noise according to the calculated optical power AC amplitude Pt1 of the pilot-tone modulation signal, the optical power DC amplitude of the optical signal when the pilot-tone modulation signal is loaded and the noise power Pase in the bandwidth of the tunable optical filter 200, and calculates the optical signal to noise ratio of the to-be-detected optical signal according to the modulation depth of the pilot-tone modulation signal and the modulation depth of the ASE noise. A specific calculation process is as follows:

The modulation depth m1 of the pilot-tone modulation signal is equal to Pt1/Ps1, wherein the Pt1 is the optical power AC amplitude of the pilot-tone modulation signal of the source end; and Ps1 is the optical power DC amplitude of the optical signal with the source end loaded with the pilot-tone modulation signal, as shown in FIG. 2.

Generally, label information is marked in the pilot-tone modulation signal loaded by the optical module of the optical forwarding unit in the high-speed optical transmission system so as to obtain the modulation depth m1 of the pilot-tone modulation signal of the source end (i.e. the optical module of the optical forwarding unit); the optical signal to noise ratio calculation unit 440 is configured with a coding mode corresponding to the label information in advance. For example, as shown in FIG. 2 and FIG. 3, the label information with the pilot-tone modulation signal is bit information "1", and the label information without the pilot-tone modulation signal is the bit information "0"; and the coding format is set according to a real situation.

The modulation depth m2 of the pilot-tone modulation signal is equal to Pt2/(Ps2+Pase), wherein Pt2 is the optical power AC amplitude of the pilot-tone modulation signal accessed by the optical switch 100; Ps2 is the optical power DC amplitude of the optical signal with the pilot-tone modulation signal accessed by the optical switch 100; and Pase is the noise power in the bandwidth of the tunable optical filter 200, as shown in FIG. 3.

Therefore, the optical signal to noise ratio may be calculated according to $OSNR_t = Ps2/Pase = m1/(m1-m2)$; and then the tunable optical filter 200 may correct the calculated optical signal to noise ratio as the optical signal to noise ratio satisfying a standard according to the bandwidth characteristics, i.e. the optical signal to noise ratio in the 0.1 nm bandwidth.

Specifically, as shown in FIG. 1, the AC signal conditioning unit 420 includes a first amplification subunit 421, a first voltage following subunit 422 and a first ADC sampling subunit 423; an input end of the first amplification subunit 421 is connected with the output end of the voltage following unit 410; an output end of the first amplification subunit 421 is connected with an input end of the first voltage following subunit 422; an output end of the first voltage following subunit 422 is connected with an input end of the first ADC sampling subunit 423; and an output end of the first ADC sampling subunit 423 is connected with a first input end of the optical signal to noise ratio calculation unit 440.

The first amplification subunit 421 is configured to amplify the AC signal in the voltage signal extracted by the voltage following unit 410; the first voltage following subunit 422 is configured to extract the AC signal amplified by the first amplification subunit 421; and the first ADC sampling subunit 423 is configured to convert the AC signal extracted by the first voltage following subunit into the first digital signal and output the first digital signal to the optical signal to noise ratio calculation unit 440.

As shown in FIG. 1, the DC signal conditioning unit 430 includes a second amplification subunit 431, a second voltage following subunit 432 and a second ADC sampling subunit 433; an input end of the second amplification subunit 431 is connected with the output end of the voltage following unit 410; an output end of the second amplification subunit 431 is connected with an input end of the second voltage following subunit 432; an output end of the second voltage following subunit 432 is connected with an input end of the second ADC sampling subunit 433; and an output end of the second ADC sampling subunit 433 is connected with a second input end of the optical signal to noise ratio calculation unit 440.

The second amplification subunit 431 is configured to amplify the DC signal in the voltage signal extracted by the voltage following unit; the second voltage following subunit 432 is configured to extract the DC signal amplified by the second amplification subunit 431; and the second ADC sampling subunit 433 is configured to convert the DC signal extracted by the second voltage following subunit 432 into the second digital signal and output the second digital signal to the optical signal to noise ratio calculation unit 440.

In order to achieve the accuracy for detecting the modulation depth, both the AC signal and the DC signal in the voltage signal are required to be detected by the ADC sampling subunit. Therefore, the optical signal to noise ratio detection circuit in embodiments of the present invention samples the AC signal and the DC signal simultaneously through two ADC sampling subunits (i.e. the first ADC sampling subunit 423 and the second ADC sampling subunit 433), thereby ensuring the synchronous detection of the AC signal and the DC signal.

Figure 4:
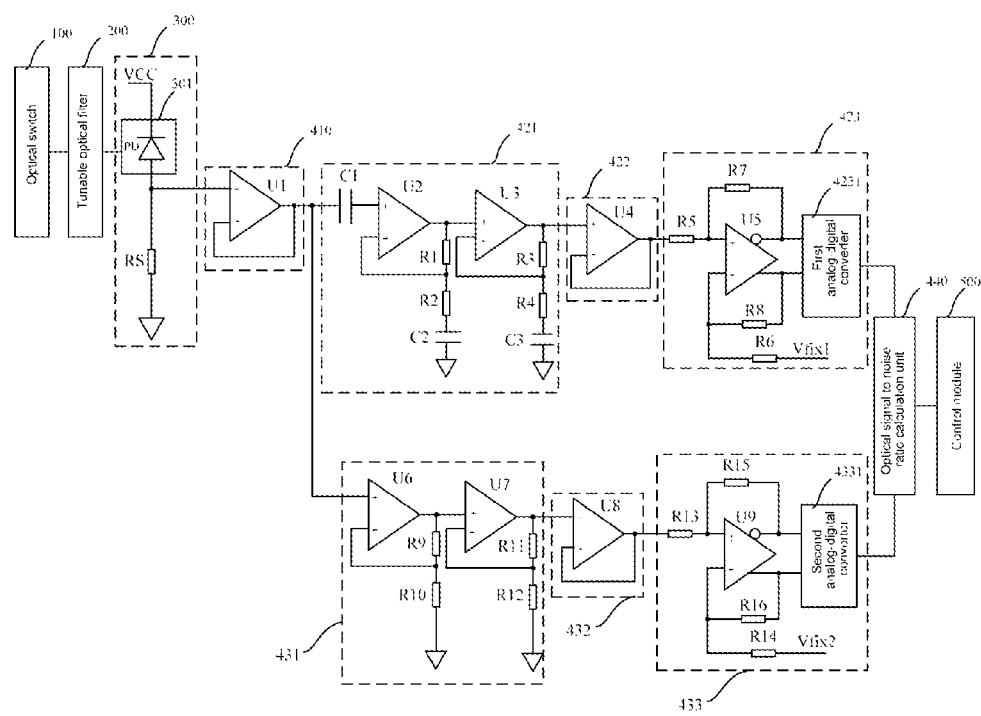
FIG. 4 is a schematic circuit structural diagram illustrating an embodiment of an optical signal to noise ratio detection circuit according to the present invention.

Referring to FIG. 4, FIG. 4 is a schematic circuit structural diagram illustrating an embodiment of the optical signal to noise ratio detection circuit according to embodiments of the present invention.

As shown in FIG. 4, the photoelectric conversion module 300 includes an optical detector PD and a sampling resistor RS; a negative end of the optical detector PD is connected with a linear power supply VCC; a positive end of the optical detector PD is earthed through the sampling resistor RS; a common end of the optical detector PD and the sampling resistor RS is used as an output end of the photoelectric conversion module 300; and the common end of the optical detector PD and the sampling resistor RS is connected with the input end of the pilot-tone modulation signal conditioning module 400 so as to output the voltage signal to the pilot-tone modulation signal conditioning module 400.

A reversed bias voltage sampling linear power supply is accessed to the optical detector PD in the photoelectric conversion module 300 without adopting a switch power supply, so that the interference of the switch power supply on the output of the optical detector PD is avoided. In order to avoid an interference signal outside the optical detector PD, as shown in FIG. 4, a shielding shell 301 may be arranged around the optical detector PD, and the shielding shell 301 is earthed, i.e. the earthed shielding shell 301 surrounds the optical detector PD. In order to ensure the current sampling precision of the sampling resistor RS, a high-precision resistor is employed, such as a resistor with the precision of 0.1%.

In the pilot-tone modulation signal conditioning module 400, the voltage following unit 410 includes a first voltage follower U1; an in-phase input end of the first voltage follower U1 is used as the input end of the voltage following unit 410 and is also used as the input end of the pilot-tone modulation signal conditioning module 400; and the in-phase input end of the first voltage follower U1 is connected with the output end of the photoelectric conversion module 300; in FIG. 4, the in-phase input end of the first voltage follower U1 is connected with the common end of the optical detector PD and the sampling resistor RS; an anti-phase input end of the first voltage follower U1 is connected with the output end of the first voltage follower U1; and the output end of the first voltage follower U1 is respectively connected with the input ends of the AC signal conditioning unit 420 and the DC signal conditioning unit 430.

The first amplification subunit 421 includes a first amplifier U2, a second amplifier U3, a first capacitor C1, a second capacitor C2, a third capacitor C3, a first resistor R1, a second resistor R2, a third resistor R3 and a fourth resistor R4.

An in-phase input end of the first amplifier U2 is connected with the output end of the voltage following unit through the first capacitor C1; in FIG. 4, the in-phase input end of the first amplifier U2 is connected with the output end of the first voltage follower U1 through the first capacitor C1; the output end of the first amplifier U2 is connected with an in-phase input end of the second amplifier U3 and is earthed successively through the first resistor R1, the second resistor R2 and the second capacitor C2; and an anti-phase input end of the first amplifier U2 is connected with the common end of the first resistor R1 and the second resistor R2.

The output end of the second amplifier U3 is connected with the input end of the first voltage following subunit 422 and is earthed successively through the third resistor R3, the fourth resistor R4 and the third capacitor C3; and an anti-phase input end of the second amplifier U3 is connected with a common end of the third resistor R3 and the fourth resistor R4.

The first voltage following subunit 422 includes a second voltage follower U4; an in-phase input end of the second voltage follower U4 is connected with the output end of the first amplification subunit 421; an anti-phase input end of the second voltage follower U4 is connected with the output end of the second voltage follower U4; and the output end of the second voltage follower U4 is connected with the input end of the first ADC sampling subunit 423.

The first ADC sampling subunit 423 includes a third amplifier U5, a fifth resistor R5, a sixth resistor R6, a seventh resistor R7, an eighth resistor R8 and a first analog-digital converter 4231; an in-phase input end of the third amplifier U5 is connected with the output end of the first voltage following subunit 422 through the fifth resistor R5; in FIG. 4, the in-phase input end of the third amplifier U5 is connected with the output end of the second amplifier U3 through the fifth resistor R5; an anti-phase input end of the third amplifier U5 is connected to a first reference power supply Vfix1 through the sixth resistor R6; a first differential output end of the third amplifier U5 is connected with a first sampling end of the first analog-digital converter 4231; a second differential output end of the third amplifier U5 is connected with a second sampling end of the first analog-digital converter 4231; the seventh resistor R7 is connected between the first differential output end of the third amplifier U5 and the in-phase input end of the third amplifier U5; the eighth resistor R8 is connected between the second differential output end of the third amplifier U5 and the anti-phase input end of the third amplifier U5; and the output end of the first analog-digital converter 4231 is connected with the first input end of the optical signal to noise ratio calculation unit 440.

The second amplification subunit 431 includes a fourth amplifier U6, a fifth amplifier U7, a ninth resistor R9, a tenth resistor R10, an eleventh resistor R11 and a twelfth resistor R12.

An in-phase input end of the fourth amplifier U6 is connected with the output end of the voltage following unit; an output end of the fourth amplifier U6 is connected with an in-phase input end of the fifth amplifier U7 and is earthed successively through the ninth resistor R9 and the tenth resistor R10; and an anti-phase input end of the fourth amplifier U6 is connected with a common end of the ninth resistor R9 and the tenth resistor R10.

The output end of the fifth amplifier U7 is connected with the input end of the second voltage following subunit 432 and is earthed successively through the eleventh resistor R11 and the twelfth resistor R12; and an anti-phase input end of the fifth amplifier U7 is connected with a common end of the eleventh resistor R11 and the twelfth resistor R12.

The second voltage following subunit 432 includes a third voltage follower U8; an in-phase input end of the third voltage follower U8 is connected with the output end of the second amplification subunit 431; an anti-phase input end of the third voltage follower U8 is connected with the output end of the third voltage follower U8; and the output end of the third voltage follower U8 is connected with the input end of the second ADC sampling subunit 433.

The second ADC sampling subunit 433 includes a sixth amplifier U9, a thirteenth resistor R13, a fourteenth resistor R14, a fifteenth resistor R15, a sixteenth resistor R16 and a second analog-digital converter 4331; an in-phase input end of the sixth amplifier U9 is connected with the output end of the second voltage following subunit 432 through the thirteenth resistor R13; an anti-phase input end of the sixth amplifier U9 is connected to a second reference power supply Vfix2 (in the present embodiment, the second reference power supply Vfix 2 and the first reference power supply Vfix1 supply the same reference voltage) through the fourteenth resistor R14; a first differential output end of the sixth amplifier U9 is connected with the first sampling end of the second analog-digital converter 4331; a second differential output end of the sixth amplifier U9 is connected with the second sampling end of the second analog-digital converter 4331; the fifteenth resistor R15 is connected between the first differential output end of the sixth amplifier U9 and the in-phase input end of the sixth amplifier U9; the sixteenth resistor R16 is connected between the second differential output end of the sixth amplifier U9 and the anti-phase input end of the sixth amplifier U9; and the output end of the second analog-digital converter 4331 is connected with the second input end of the optical signal to noise ratio calculation unit 440.

As shown in FIG. 4, an operating principle of the optical signal to noise ratio detection circuit in embodiments of the present invention is described as follows:

the to-be-detected optical signal gated by the optical switch 100 enters the tunable optical filter 200; the tunable optical filter 200 adjusts the modulation frequency of the to-be-detected optical signal gated by the optical switch 100 as the center frequency of the to-be-detected optical signal, filters the to-be-detected optical signal, selects the to-be-detected partial waves of the to-be-detected optical signal as required, and filters out the rest partial waves.

The optical detector PD detects the to-be-detected optical signal output by the tunable optical filter 200; when the optical detector PD detects that the to-be-detected optical signal exists, the to-be-detected optical signal is received, and the to-be-detected optical signal is converted to the corresponding current signal; the current signal forms the voltage signal on the sampling resistor RS; the voltage signal is output to the in-phase input end of the first voltage follower U1, and at the moment, the output end of the first voltage follower U1 outputs a complete distortion-free voltage signal.

Due to an effect of the first capacitor C1 for isolating the DC power but allowing the AC power to pass through, the AC signal in the voltage signal is input to the in-phase input end of the first amplifier U2 through the first capacitor C1; the first amplifier U2 and the second amplifier U3 amplify the input AC signal; as shown in FIG. 4, an amplification factor of the first amplification subunit 421 is: $G=((R_1+R_2)/R_2)*((R_3+R_4)/R_4)$, wherein $R_1$ is a resistance value of the first resistor R1, $R_2$ is a resistance value of the second resistor R2, $R_3$ is a resistance value of the third resistor R3, and $R_4$ is a resistance value of the fourth resistor R4. It can be known from the above formula that the amplification factor of the first amplification subunit 421 may be adaptively set by adjusting the resistance values of the first resistor R1 and the third resistor R3, thereby flexibly adjusting the amplification factor of the first amplification subunit 421.

The AC signal amplified by the first amplifier U2 and the second amplifier U3 is input to the in-phase input end of the second voltage follower U4; the second voltage follower U4 extracts the amplified AC signal, i.e. copies the amplified AC signal to the in-phase input end of the third amplifier U5; the third amplifier U5 outputs a first differential signal to the first analog-digital converter 4231 according to a reference voltage supplied by the first reference power supply Vfix1 and the AC signal input at the in-phase input end of the third amplifier U5; the first analog-digital converter 4231 performs the analog-to-digital conversion on the first differential signal and converts the first differential signal to the first digital signal, thereby converting the analog signal to the digital signal identifiable by the optical signal to noise ratio calculating unit; and the first analog-digital converter 4231 outputs the output first digital signal to the optical signal to noise ratio calculating unit.

Meanwhile, the DC signal in the voltage signal is input to the in-phase input end of the fourth amplifier U6; the fourth amplifier U6 and the fifth amplifier U7 amplify the input DC signal; as shown in FIG. 4, an amplification factor of the second amplification subunit 431 is as follows: $G=((R_9+R_{10})/R_{10})*((R_{11}+R_{12})/R_{12})$, wherein $R_9$ is a resistance value of the ninth resistor R9, $R_{10}$ is a resistance value of the tenth resistor R10, $R_{11}$ is a resistance value of the eleventh resistor R11, and $R_{12}$ is a resistance value of the twelfth resistor R12. It can be known from the above formula that the amplification factor of the second amplification subunit 431 may be adaptively set by adjusting the resistance values of the ninth resistor R9 and the eleventh resistor R11, thereby flexibly adjusting the amplification factor of the second amplification subunit 431.

The DC signal amplified by the fourth amplifier U6 and the fifth amplifier U7 is input to the in-phase input end of the third voltage follower U8; the third voltage follower U8 extracts the amplified DC signal, i.e. copies the amplified DC signal to the in-phase input end of the sixth amplifier U9; the sixth amplifier U9 outputs a second differential signal to the second analog-digital converter 4331 according to the reference voltage supplied by the second reference power supply Vfix2 and the AC signal input at the in-phase input end of the sixth amplifier U9; the second analog-digital converter 4331 performs the analog-to-digital conversion on the second differential signal and converts the second differential signal to the second digital signal, thereby converting the analog signal to the digital signal identifiable by the optical signal to noise ratio calculating unit; and the second analog-digital converter 4331 outputs the output second digital signal to the optical signal to noise ratio calculating unit.

The optical signal to noise ratio calculation unit 440 calculates the optical power AC amplitude Pt1 of the pilot-tone modulation signal, the optical power DC amplitude of the optical signal when the pilot-tone modulation signal is loaded and the noise power Pase in the bandwidth of the tunable optical filter 200 by utilizing an FFT algorithm according to the received first digital signal and the second digital signal; determines the modulation depth m1 of the pilot-tone modulation signal and the modulation depth m2 of the ASE noise according to the optical power AC amplitude Pt1 of the pilot-tone modulation signal, the optical power DC amplitude of the optical signal when the pilot-tone modulation signal is loaded and the noise power Pase in the bandwidth of the tunable optical filter 200 obtained by calculation; and calculates the optical signal to noise ratio OSNRt of the to-be-detected optical signal according to the modulation depth m1 of the pilot-tone modulation signal and the modulation depth m2 of the ASE noise. A specific calculation process is described with reference to above and is not repeated herein.

Embodiments of the present invention further provide an optical signal to noise ratio detection apparatus which is applied to a high-speed optical transmission system.

Referring to FIG. 1 to FIG. 5, FIG. 5 is a principle block diagram illustrating an embodiment of an optical signal to noise ratio detection apparatus according to the present invention.

Figure 5:
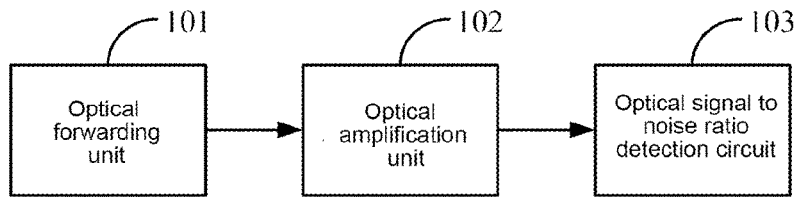
FIG. 5 is a principle block diagram illustrating an embodiment of an optical signal to noise ratio detection apparatus according to the present invention.

As shown in FIG. 5, the optical signal to noise ratio detection apparatus includes an optical forwarding unit 101, a plurality of optical amplification units 102 and an optical signal to noise ratio detection circuit 103. The optical forwarding unit 101 modulates a pilot-tone modulation signal onto a main optical signal in an optical module thereof and outputs an optical signal with the pilot-tone modulation signal; and each optical amplification unit 102 receives the optical signal output by the optical forwarding unit 101, and selects a part of the received optical signals to send to the optical signal to noise ratio detection circuit 103 to perform the optical signal to noise ratio detection so as to provide multi-way to-be-detected optical signals containing the pilot-tone modulation signal and ASE noise.

The optical forwarding unit 101 modulates the pilot-tone modulation signal onto the main optical signal in the optical module thereof; and the pilot-tone modulation signal modulated on the main optical signal carries a label for marking a modulation depth m1 of the pilot-tone modulation signal, so that the modulation depth m1 of the pilot-tone modulation signal can be identified when a pilot-tone modulation signal conditioning module in the optical signal to noise ratio detection circuit 103 receives the to-be-detected optical signal.

A plurality of detection stations may be arranged in the high-speed optical transmission system to detect an optical signal to noise ratio of the optical signal; and generally each detection station needs an optical signal to noise ratio detection circuit 103 for detection. According to actual needs, each station may be provided with a plurality of optical amplification units 102; each optical amplification unit 102 sends the received optical signal with the modulation signal to the optical signal to noise ratio detection circuit 103 for detection, so that an optical switch of the optical signal to noise ratio detection circuit 103 may access multi-way to-be-detected optical signals, and circularly gate one-way to-be-detected optical signal to perform the detection from the multi-way to-be-detected optical signals; and since ASE noise interference exists in the process of sending the to-be-detected optical signal by the optical amplification unit 102, the to-be-detected optical signal received by the optical switch contains the pilot-tone modulation signal and the ASE noise.

The optical signal to noise ratio detection circuit 103 calculates the optical signal to noise ratio of the to-be-detected optical signal according to the to-be-detected optical signal containing the pilot-tone modulation signal and the ASE noise and accessed by the optical switch, and reports the calculated optical signal to noise ratio to the optical transmission management system. In the optical signal to noise ratio detection apparatus, the structure, the specific process for detecting the optical signal to noise ratio and the beneficial effects of the optical signal to noise ratio detection circuit 103 refer to the above embodiments and are not repeated herein.

Embodiments of the present invention further provide an optical signal to noise ratio detection method. The optical signal to noise ratio detection method is applied to the optical signal to noise ratio detection apparatus.

Figure 6:
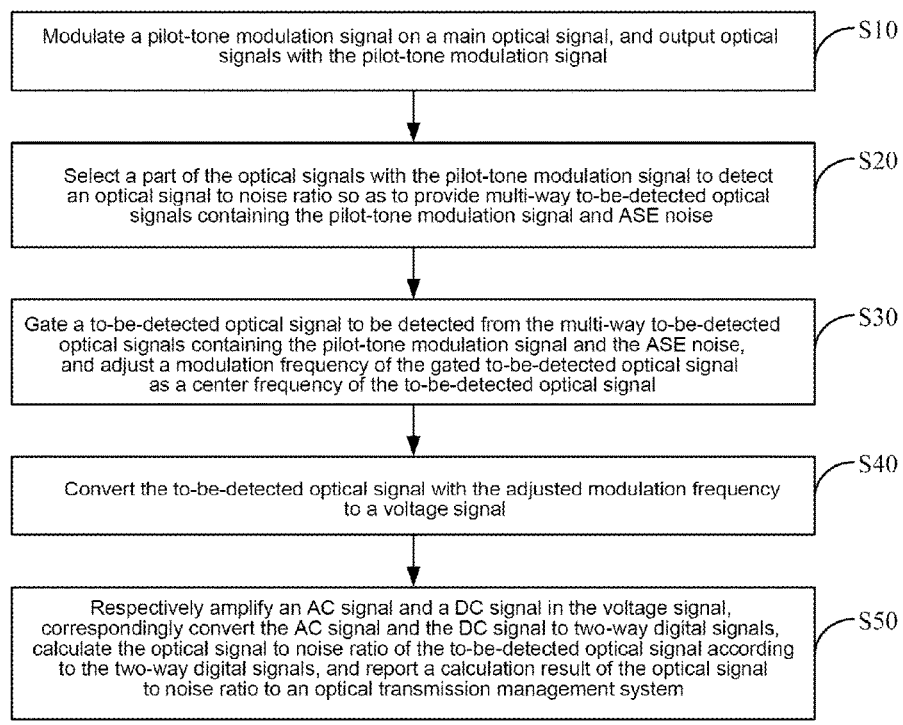
FIG. 6 is a flow chart illustrating an embodiment of an optical signal to noise ratio detection method according to the present invention.

Referring to FIG. 6, FIG. 6 is a flow chart illustrating an embodiment of an optical signal to noise ratio detection method according to the present invention.

As shown in FIG. 6, the optical signal to noise ratio detection method includes following steps.

In step S10: a pilot-tone modulation signal is modulated on a main optical signal, and optical signals with the pilot-tone modulation signal are output;

in step S20: a part of the optical signals with the pilot-tone modulation signal is selected to detect the optical signal to noise ratio so as to provide multi-way to-be-detected optical signals containing the pilot-tone modification signal and the ASE noise;

in step S30: the to-be-detected optical signal to be detected is gated from the multi-way to-be-detected optical signals containing the pilot-tone modulation signal and the ASE noise, and a modulation frequency of a gated to-be-detected optical signal is adjusted as a center frequency of the to-be-detected optical signal;

in step S40: the to-be-detected optical signal with the adjusted modulation frequency is converted into a voltage signal; and in step S50: after being respectively amplified, an AC signal and a DC signal in the voltage signal are correspondingly converted into two-way digital signals, an optical signal to noise ratio of the to-be-detected optical signal is calculated according to the two-way digital signals, and a calculation result of the optical signal to noise ratio is reported to an optical transmission management system.

In the optical signal to noise ratio detection apparatus, the optical forwarding unit modulates the pilot-tone modulation signal onto the main optical signal in the optical module of the optical forwarding unit; and the pilot-tone modulation signal modulated on the main optical signal carries a label for marking a modulation depth of the pilot-tone modulation signal, so that the modulation depth of the pilot-tone modulation signal can be identified when a pilot-tone modulation signal conditioning module in the optical signal to noise ratio detection circuit receives the to-be-detected optical signal.

A plurality of detection stations may be arranged in the high-speed optical transmission system to detect an optical signal to noise ratio of the optical signal; and generally each detection station needs an optical signal to noise ratio detection circuit for detection. According to actual needs, each station may be provided with a plurality of optical amplification units; each optical amplification unit sends the received optical signal with the modulation signal to the optical signal to noise ratio detection circuit for detection, so that an optical switch of the optical signal to noise ratio detection circuit may access multi-way to-be-detected optical signals, and circularly gate one-way to-be-detected optical signal to perform the detection from the multi-way to-be-detected optical signals; and since ASE noise interference exists in the process of sending the to-be-detected optical signal by the optical amplification unit, the to-be-detected optical signal received by the optical switch contains the pilot-tone modulation signal and the ASE noise.

In the optical signal to noise ratio detection circuit, multi-way to-be-detected optical signals containing the pilot-tone modulation signal and ASE noise are accessed through the optical switch, the to-be-detected optical signal is gated from the accessed multi-way to-be-detected optical signals to detect the optical signal to noise ratio; the optical switch may access 4 to 8 ways of to-be-detected optical signals; and the optical switch gates one-way to-be-detected optical signal to perform the detection each time; for example, when the optical switch accesses five ways of to-be-detected optical signals, the optical switch gates one-way to-be-detected optical signal to perform the detection each time, and the five ways of to-be-detected optical signals are successively circularly gated. The tunable optical filter adjusts a modulation frequency of the to-be-detected optical signal gated by the optical switch as a center frequency of the to-be-detected optical signal; the to-be-detected optical signal gated by the optical switch may include a plurality of partial waves of different frequencies (i.e. different wavelengths); each partial wave has the center frequency; the tunable optical filter circularly scans each partial wave to find out the center frequency of each partial wave each time; and then the frequency of the partial wave is adjusted as the center frequency, so that the frequency of the partial wave is stable. For example, an to-be-detected optical signal includes 80 partial waves, and the tunable optical filter circularly scans the 80 partial waves and finds out the center frequencies of the partial waves; and furthermore, not all of the 80 partial waves are necessarily detected, and the tunable optical filter may select the partial waves to be detected as required, and filters out the rest partial waves.

The photoelectric conversion module converts the to-be-detected optical signal with adjusted modulation frequency into a voltage signal; and the voltage signal includes an AC signal with a pilot-tone modulation signal and a DC signal with ASE noise and the pilot-tone modulation signal. The pilot-tone modulation signal conditioning module respectively amplifies the AC signal and the DC signal in the voltage signal, correspondingly converts the AC signal and the DC signal into two-way digital signals, determines a modulation depth of the pilot-tone modulation signal and the modulation depth of the ASE noise according to the two-way digital signals, and calculates an optical signal to noise ratio of the to-be-detected optical signal, and the control module reports a calculation result of the optical signal to noise ratio to the optical transmission management system. In this way, the optical signal to noise ratio of each way of to-be-detected signal is circularly calculated, thereby detecting the optical signal to noise ratio of the optical signal in the high-speed optical transmission system.

Relative to the existing art, the optical signal to noise ratio detection method in embodiments of the present invention can accurately detect the optical signal to noise ratio of each way of accessed optical signal, is applicable to the high-speed optical transmission systems of 40 Gb/s and 100 Gb/s, and solves the problem that the traditional interpolation method cannot realize the detection of the optical signal to noise ratio in the high-speed optical transmission systems.

The above are only embodiments of the present invention and not therefore intended to limit the patent scope of the present invention. Equivalent structural variations or equivalent process variations made by using the description and the drawings of the present invention are directly or indirectly applied to other related technical fields and are equally included within the patent protection scope of the present invention.

INDUSTRIAL APPLICABILITY

As mentioned above, through the above embodiments and implementation modes, the optical signal to noise ratio of each way of accessed optical signal can be accurately detected. The present invention is applicable to the high-speed optical transmission systems of 40 Gb/s and 100 Gb/s and solves the problem that the traditional interpolation method cannot realize the detection of the optical signal to noise ratio in the high-speed optical transmission systems.

What is claimed is:

1. An optical signal to noise ratio detection circuit, comprising:
    an optical switch, configured to access multi-way to-be-detected optical signals containing a pilot-tone modulation signal and amplified spontaneous emission ASE noise, and gate a to-be-detected optical signal to be detected from the multi-way to-be-detected optical signals;
    a tunable optical filter, configured to adjust a modulation frequency of the to-be-detected optical signal gated by the optical switch as a center frequency of the to-be-detected optical signal;
    a photoelectric conversion circuit, configured to convert the to-be-detected optical signal with the adjusted modulation frequency to a voltage signal;
    a pilot-tone modulation signal conditioning circuit, configured to respectively amplify an AC signal and a DC signal in the voltage signal, correspondingly convert the AC signal and the DC signal to two-way digital signals, determine a modulation depth of the pilot-tone modulation signal and a modulation depth of the ASE noise according to the two-way digital signals, and calculate an optical signal to noise ratio of the to-be-detected optical signal; and
    a CPU, configured to control operation of the optical switch, the tunable optical filter, the photoelectric conversion circuit and the pilot-tone modulation signal conditioning circuit, and report a calculation result of the optical signal to noise ratio to an optical transmission management system,
    wherein the first end of the optical switch is connected to the first end of the tunable optical filter, the second end of the optical switch is connected to the CPU, the second end of the tunable optical filter is connected to the first end of the photoelectric conversion circuit, the third end of the tunable optical filter is connected to the CPU, and the second end of the photoelectric conversion circuit is connected to the first end of the pilot-tone modulation signal conditioning circuit, and the third end of the photoelectric conversion circuit is connected to the CPU, and the second end of the pilot-tone modulation signal conditioning circuit is connected to the CPU.

2. The optical signal to noise ratio detection circuit of claim 1, wherein the photoelectric conversion circuit comprises an optical detector and a sampling resistor; a negative end of the optical detector is connected with a linear power supply; a positive end of the optical detector is earthed through the sampling resistor; and a common end of the optical detector and the sampling resistor is connected with an input end of the pilot-tone modulation signal conditioning circuit, so as to output the voltage signal to the pilot-tone modulation signal conditioning circuit.

3. The optical signal to noise ratio detection circuit of claim 1, wherein the pilot-tone modulation signal conditioning circuit comprises:
    a voltage following circuit, configured to extract the voltage signal output by the photoelectric conversion circuit;
    an AC signal conditioning circuit, configured to amplify the AC signal in the voltage signal, and convert the amplified AC signal to a first digital signal;

a DC signal conditioning circuit, configured to amplify the DC signal in the voltage signal, and convert the amplified DC signal to a second digital signal; and an optical signal to noise ratio calculation circuit, configured to calculate an optical power AC amplitude of the pilot-tone modulation signal, an optical power DC amplitude of the optical signal when the pilot-tone modulation signal is loaded, and noise power in a bandwidth of the tunable optical filter by utilizing an FFT algorithm according to the first digital signal and the second digital signal so as to determine the modulation depth of the pilot-tone modulation signal and the modulation depth of the ASE noise, and calculate the optical signal to noise ratio of the to-be-detected optical signal according to the modulation depth of the pilot-tone modulation signal and the modulation depth of the ASE noise, wherein the second end of the photoelectric conversion circuit is connected to the first end of the voltage following circuit, the second end of the voltage following circuit is connected to the first end of the AC signal conditioning circuit, the third end of the voltage following circuit is connected to the first end of the DC signal conditioning circuit, the second end of the AC signal conditioning circuit is connected to the first end of the optical signal to noise ratio calculation circuit, and the second end of the DC signal conditioning circuit is connected to the second end of the optical signal to noise ratio calculation circuit.

4. The optical signal to noise ratio detection circuit of claim 3, wherein the voltage following circuit comprises a first voltage follower; an in-phase input end of the first voltage follower is connected with an output end of the photoelectric conversion circuit, an anti-phase input end of the first voltage follower is connected with an output end of the first voltage follower, and the output end of the first voltage follower is respectively connected with the input ends of the AC signal conditioning circuit and the DC signal conditioning circuit.

5. The optical signal to noise ratio detection circuit of claim 3, wherein the AC signal conditioning circuit comprises:

a first amplification subcircuit, configured to amplify the AC signal in the voltage signal extracted by the voltage following circuit;

a first voltage following subcircuit, configured to extract the AC signal amplified by the first amplification subcircuit; and a first ADC sampling subcircuit, configured to convert the AC signal extracted by the first voltage following subcircuit to the first digital signal, and output the first digital signal to the optical signal to noise ratio calculation circuit;

wherein the second end of the voltage following circuit is connected to the first end of the first amplification subcircuit, the second end of the first amplification subcircuit is connected to the first end of the first voltage following subcircuit, the second end of the first voltage following subcircuit is connected to the first end of the first ADC sampling subcircuit, and the second end of the first ADC sampling subcircuit is connected to the first end of the optical signal to noise ratio calculation circuit.

6. The optical signal to noise ratio detection circuit of claim 5, wherein the first amplification subcircuit comprises a first amplifier, a second amplifier, a first capacitor, a second capacitor, a third capacitor, a first resistor, a second resistor, a third resistor and a fourth resistor;

an in-phase input end of the first amplifier is connected with an output end of the voltage following circuit through the first capacitor, an output end of the first amplifier is connected with an in-phase input end of the second amplifier and is earthed successively through the first resistor, the second resistor and the second capacitor, and an anti-phase input end of the first amplifier is connected with a common end of the first resistor and the second resistor;

an output end of the second amplifier is connected with an input end of the first voltage following subcircuit and is earthed successively through the third resistor, the fourth resistor and the third capacitor, and an anti-phase input end of the second amplifier is connected with a common end of the third resistor and the fourth resistor;

the first voltage following subcircuit comprises a second voltage follower; an in-phase input end of the second voltage follower is connected with the output end of the first amplification subcircuit, an anti-phase input end of the second voltage follower is connected with the output end of the second voltage follower, and the output end of the second voltage follower is connected with an input end of the first ADC sampling subcircuit;

the first ADC sampling subcircuit comprises a third amplifier, a fifth resistor, a sixth resistor, a seventh resistor, an eighth resistor and a first analog-digital converter; an in-phase input end of the third amplifier is connected with the output end of the first voltage following subcircuit through the fifth resistor, an anti-phase input end of the third amplifier is connected to a first reference power supply through the sixth resistor, a first differential output end of the third amplifier is connected with a first sampling end of the first analog-digital converter, and a second differential output end of the third amplifier is connected with a second sampling end of the first analog-digital converter; the seventh resistor is connected between the first differential output end of the third amplifier and the in-phase input end of the third amplifier, and the eighth resistor is connected between the second differential output end of the third amplifier and the anti-phase input end of the third amplifier; and the output end of the first analog-digital converter is connected with a first input end of the optical signal to noise ratio calculation circuit.

7. The optical signal to noise ratio detection circuit of claim 3, wherein the DC signal conditioning circuit comprises:

a second amplification subcircuit, configured to amplify the DC signal in the voltage signal extracted by the voltage following circuit;

a second voltage following subcircuit, configured to extract the DC signal amplified by the second amplification subcircuit; and a second ADC sampling subcircuit, configured to convert the DC signal extracted by the second voltage following subcircuit to the second digital signal, and output the second digital signal to the optical signal to noise ratio calculation circuit;

wherein the third end of the voltage following circuit is connected to the first end of the second amplification subcircuit, the second end of the second amplification subcircuit is connected to the first end of the second voltage following subcircuit, the second end of the second voltage following subcircuit is connected to the first end of the second ADC sampling subcircuit, and the second end of the second ADC sampling subcircuit is connected to the second end of the optical signal to noise ratio calculation circuit.

8. The optical signal to noise ratio detection circuit of claim 7, wherein the second amplification subcircuit comprises a fourth amplifier, a fifth amplifier, a ninth resistor, a tenth resistor, an eleventh resistor and a twelfth resistor;
an in-phase input end of the fourth amplifier is connected with an output end of the voltage following circuit, an output end of the fourth amplifier is connected with an in-phase input end of the fifth amplifier and is earthed successively through the ninth resistor and the tenth resistor, and an anti-phase input end of the fourth amplifier is connected with a common end of the ninth resistor and the tenth resistor;
an output end of the fifth amplifier is connected with an input end of the second voltage following subcircuit and is earthed successively through the eleventh resistor and the twelfth resistor, and an anti-phase input end of the fifth amplifier is connected with a common end of the eleventh resistor and the twelfth resistor;
the second voltage following subcircuit comprises a third voltage follower; and an in-phase input end of the third voltage follower is connected with the output end of the second amplification subcircuit; the anti-phase input end of the third voltage follower is connected with the output end of the third voltage follower, and the output end of the third voltage follower is connected with the input end of the second ADC sampling subcircuit; and
the second ADC sampling subcircuit comprises a sixth amplifier, a thirteenth resistor, a fourteenth resistor, a fifteenth resistor, a sixteenth resistor and a second analog-digital converter; an in-phase input end of the sixth amplifier is connected with the output end of the second voltage following subcircuit through the thirteenth resistor, an anti-phase input end of the sixth amplifier is connected to a second reference power supply through the fourteenth resistor, a first differential output end of the sixth amplifier is connected with the first sampling end of the second analog-digital converter, and a second differential output end of the sixth amplifier is connected with the second sampling end of the second analog-digital converter; the fifteenth resistor is connected between the first differential output end of the sixth amplifier and the in-phase input end of the sixth amplifier, and the sixteenth resistor is connected between the second differential output end of the sixth amplifier and the anti-phase input end of the sixth amplifier; and the output end of the second analog-digital converter is connected with a second input end of the optical signal to noise ratio calculation circuit.

9. An optical signal to noise ratio detection apparatus, comprising:
an optical forwarding circuit and a plurality of optical amplification circuits, and further comprising an optical signal to noise ratio detection circuit comprising:
an optical switch, configured to access multi-way to-be-detected optical signals containing a pilot-tone modulation signal and amplified spontaneous emission ASE noise, and gate a to-be-detected optical signal to be detected from the multi-way to-be-detected optical signals;
a tunable optical filter, configured to adjust a modulation frequency of the to-be-detected optical signal gated by the optical switch as a center frequency of the to-be-detected optical signal;
a photoelectric conversion circuit, configured to convert the to-be-detected optical signal with the adjusted modulation frequency to a voltage signal;
a pilot-tone modulation signal conditioning circuit, configured to respectively amplify an AC signal and a DC signal in the voltage signal, correspondingly convert the AC signal and the DC signal to two-way digital signals, determine a modulation depth of the pilot-tone modulation signal and a modulation depth of the ASE noise according to the two-way digital signals, and calculate an optical signal to noise ratio of the to-be-detected optical signal; and
a CPU, configured to control operation of the optical switch, the tunable optical filter, the photoelectric conversion circuit and the pilot-tone modulation signal conditioning circuit, and report a calculation result of the optical signal to noise ratio to an optical transmission management system;
wherein the optical forwarding circuit is configured to modulate a pilot-tone modulation signal onto a main optical signal in an optical circuit and output optical signals with the pilot-tone modulation signal; and each optical amplification circuit is configured to receive the optical signals output by the optical forwarding circuit and select a part of the received optical signals to send to the optical signal to noise ratio detection circuit to detect an optical signal to noise ratio so as to provide multi-way to-be-detected optical signals containing the pilot-tone modulation signal and ASE noise,
wherein the first end of the optical switch is connected to the first end of the tunable optical filter, the second end of the optical switch is connected to the CPU, the second end of the tunable optical filter is connected to the first end of the photoelectric conversion circuit, the third end of the tunable optical filter is connected to the CPU, and the second end of the photoelectric conversion circuit is connected to the first end of the pilot-tone modulation signal conditioning circuit, and the third end of the photoelectric conversion circuit is connected to the CPU, and the second end of the pilot-tone modulation signal conditioning circuit is connected to the CPU.

10. An optical signal to noise ratio detection method applied to the optical signal to noise ratio detection apparatus of claim 9, the method comprising:
modulating a pilot-tone modulation signal on a main optical signal, and outputting optical signals with the pilot-tone modulation signal;
selecting a part of the optical signals with the pilot-tone modulation signal to detect the optical signal to noise ratio so as to provide multi-way to-be-detected optical signals containing the pilot-tone modulation signal and the ASE noise;
gating a to-be-detected optical signal to be detected from the multi-way to-be-detected optical signals containing the pilot-tone modulation signal and the ASE noise, and adjusting a modulation frequency of the gated to-be-detected optical signal as a center frequency of the to-be-detected optical signal;
converting the to-be-detected optical signal with the adjusted modulation frequency to a voltage signal; and
respectively amplifying an AC signal and a DC signal in the voltage signal, correspondingly converting the AC signal and the DC signal to two-way digital signals, calculating the optical signal to noise ratio of the to-be-detected optical signal according to the two-way digital signals, and reporting a calculation result of the optical signal to noise ratio to an optical transmission management system.

\* \* \* \* \*